United States Patent [19]
Levy

[11] Patent Number: 5,813,448
[45] Date of Patent: Sep. 29, 1998

[54] DEVICE FOR SCREENING VEHICLE WINDOWS

[76] Inventor: Simon Levy, 4219 12th Ave., #3D, Brooklyn, N.Y. 11219

[21] Appl. No.: 816,923

[22] Filed: Mar. 13, 1997

[51] Int. Cl.⁶ .......................................................... B60J 3/02
[52] U.S. Cl. ...................................... 160/370.21; 160/134
[58] Field of Search ................................. 160/134, 84.07, 160/84.02, 370.21, 370.22, 370.23, DIG. 2, DIG. 3, 62, 61, 53; 296/97.4, 97.7, 97.8

[56] References Cited

U.S. PATENT DOCUMENTS

| | | | |
|---|---|---|---|
| 1,522,692 | 1/1925 | Moore | 160/134 X |
| 1,927,137 | 9/1933 | Soukup | 160/134 X |
| 2,560,762 | 7/1951 | Ghegan | 160/134 |
| 4,606,572 | 8/1986 | Maguire | 160/134 X |
| 4,681,149 | 7/1987 | Tung-Chow | 160/134 |
| 4,699,195 | 10/1987 | Lester | 160/134 |
| 4,861,090 | 8/1989 | Gavrieli | 160/134 |
| 5,010,939 | 4/1991 | King | 160/134 X |
| 5,117,889 | 6/1992 | Coe | 160/134 |
| 5,584,329 | 12/1996 | Thomas | 160/134 |
| 5,657,810 | 8/1997 | Levy et al. | 160/370.21 |

FOREIGN PATENT DOCUMENTS

| | | | |
|---|---|---|---|
| 1256866 | 2/1961 | France | 160/134 |

*Primary Examiner*—David M. Purol
*Attorney, Agent, or Firm*—Ilya Zhorovsky

[57] ABSTRACT

A device for screening vehicle windows has drive, a carrier turnable by the drive about a turning axis, and a plurality of elongated screening elements which are turnable by the carrier between a closed position in which all the elongated screening elements are coextensive with one another and an open position in which the elongated screening elements are displaced relative one another to form a fan-like screen, the carrier having at least one pin which is spaced from the turning axis, the elongated screening elements having at least one substantially arcuate slot formed around the turning axis so that the pin can extend through all the slots of the elongated screening elements, the slots of the elongated screening elements having different arcuate length so that in the open position the screening elements are located at different angles from the closed position.

9 Claims, 3 Drawing Sheets

DEVICE FOR SCREENING VEHICLE WINDOWS

BACKGROUND OF THE INVENTION

The present invention relates to devices for screening vehicle windows.

It is known that vehicle windows allow light to penetrate to them, which is necessary for driving. However, during periods of stoppage it is desirable to screen the vehicle windows so that the light including the sunlight can not penetrate through the windows. Otherwise, the sun light destroys the materials of the car interior, the light does not allow a vehicle occupant who wants to relax inside the vehicle to relax, etc. It is therefore desirable to screen the vehicle endows so as to prevent light penetrations through them. Manual devices are known formed as pieces of cardboard or another material; however, manipulation with them is inconvenient. Recently, also motor-power devices have been developed, which include a motor and a plurality of elongated screening elements operatable by the motor and tunable between a closed position in which the elongated screening elements are coextensive with one another, and an open position in which the elated screening elements are spread in a fan-like fashion. It is understood that such devices can be further improved.

SUMMARY OF THE INVENTION

Accordingly, it is an object of present invention to provide a screening device for vehicle windows, which avoids the disadvantages of the prior art and is a further improvement.

In keeping with these objects and with others which will become apparent hereinafter, one feature of the present invention resides, briefly stated, in a device for screening vehicle windows, which has drive means; a carrier turnable by the drive means about a turning axis; and a plurality of elongated screening elements which are turnable by the carrier between a closed position in which all the elated screening elements are coextensive with one another and an open position in which the elongated screening elements are displaced relative one another to form a fan-like screen, the carrier having at least one pin which is spaced from the turning axis, the elongated screening elements having at least one substantially arcuate slot formed around the turning axis so that the pin can extend through all the slots of the elongated screening elements, the slots of the elongated screening elements the slots of the elongated screening elements having different arcuate length so that in the open position the screening elements are located at different angles from the closed position.

The novel features which are considered as characteristic for the present invention are set forth in particular in the appended claims. The invention itself, however, both as to its construction and its method of operation, together with additional objects and advantages thereof, will be best understood from the following description of Specific embodiments when read in connection with the accompanying drawings.

DESCRIPTION OF PREFERRED EMBODIMENTS

Figure 1:
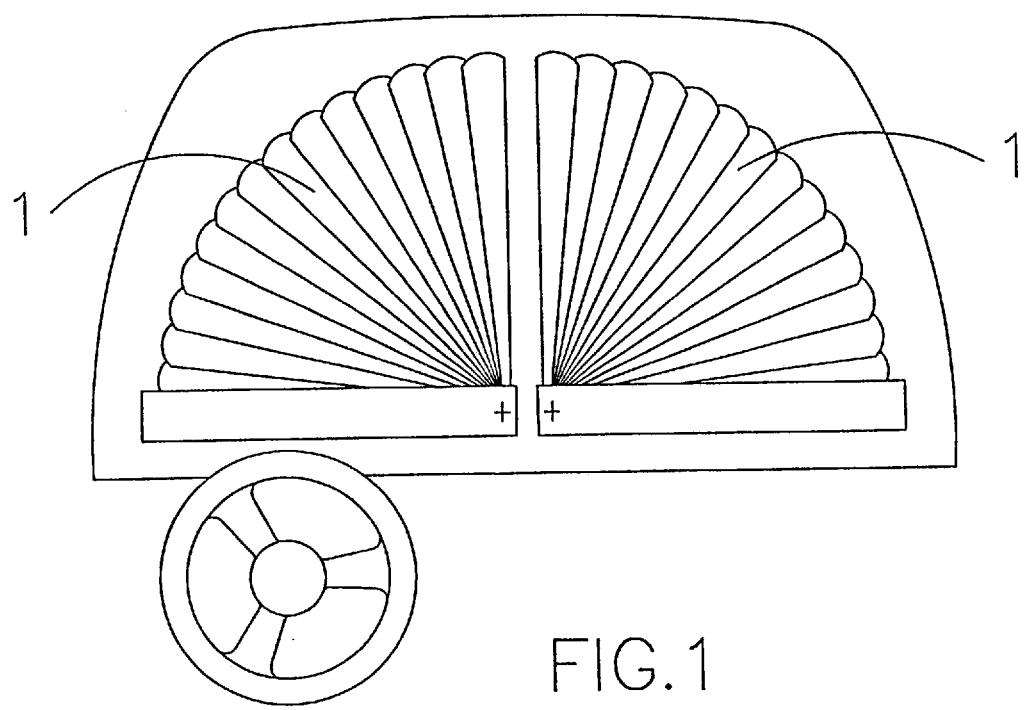
FIG. 1 is a view schematically showing a vehicle window with two screening devices in accordance with the present invention.
Figure 2:
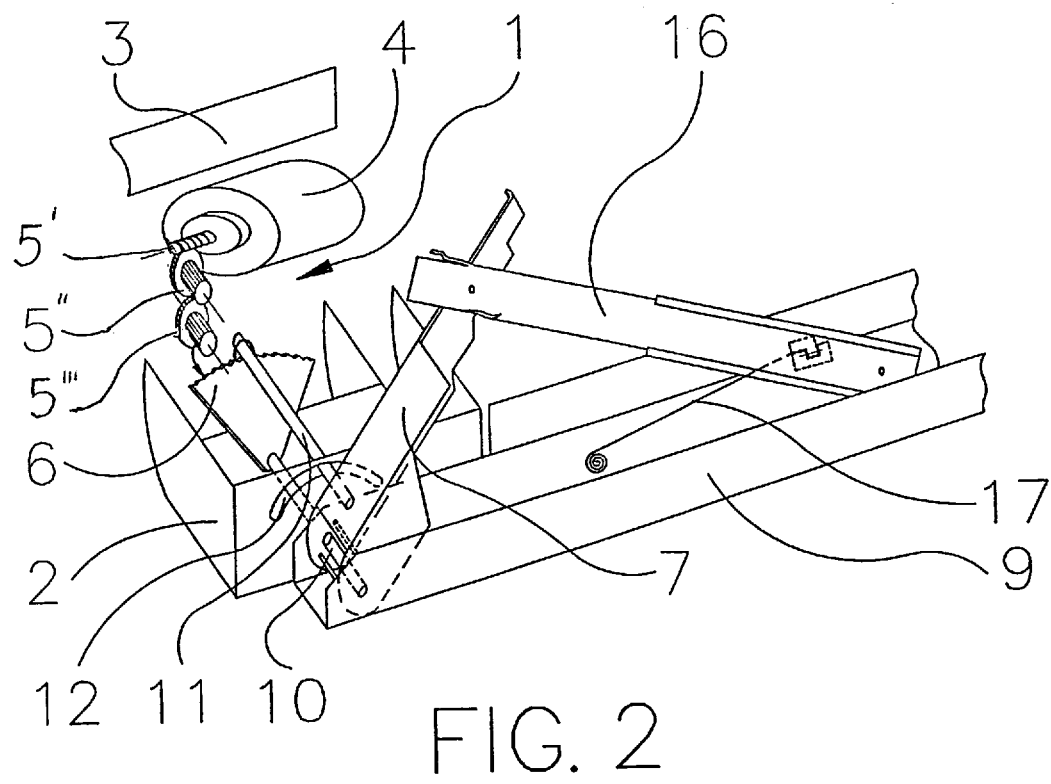
FIG. 2 is a perspective view of main units of the inventive screening device.
Figure 3:
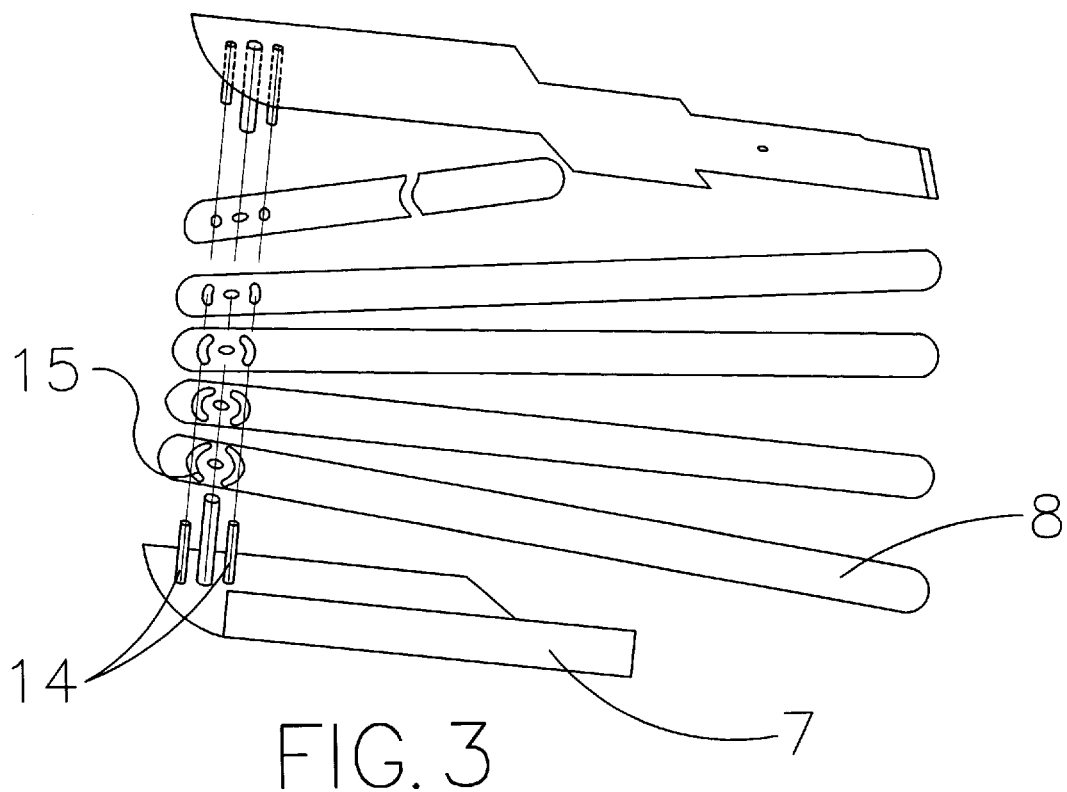
FIG. 3 is a view showing a plurality of elongated screening elements of the inventive screening device.
Figure 4:
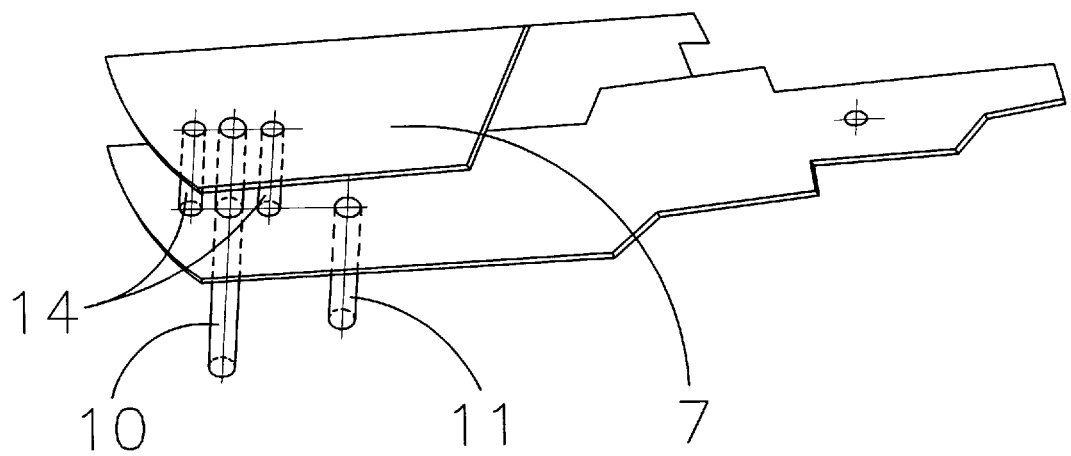
FIG. 4 is a view showing a bracket-shaped carrier for the elongated screening element of the inventive screening device.

FIG. 1 shows two devices for screening vehicle window in accordance with the present invention, each associated with a half of a windshield of a vehicle. The screening device in accordance With the present invention has a drive which is identified as a whole with reference numeral 1 and is accommodated in a drive housing 2 closeable by a cover 3. The drive 1 includes an electric motor 4 which is supplied with current from an electrical system of the vehicle, a plurality of gears 5', 5", 5''' engaging with one another, and a toothed segment 6 having a plurality of teeth on its arcuate surface. The input gear is connected with the output shaft of the electric motor 4, while the output gear engages with the teeth of the segment 6. The transmission ratio of the transmission is selected so that the rotary speed of the output gear is substantially smaller than the rotary speed of the input gear.

Figure 6:
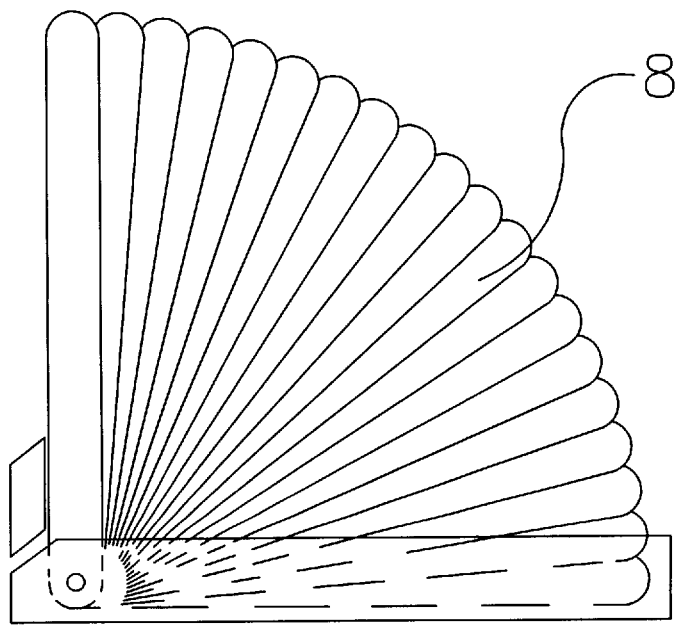
FIG. 6 is a view showing the inventive screening device in an open, screening position.

The device further has a carrier 7 which is formed as a bracket, and a plurality of elongated screening elements 8. The carrier 7 with the elongated screening elements 8 is movable between a close position in which they are located in a box shaped housing 9 and are coextensive with one another, and an open position in which they are withdrawn from the housing 9 and form a fan-like screen shown in FIGS. 1 and 6. The center of the segment 6 and the center of the end of the carrier 7 are connected with one another by an axle extending through a hole in the walls of the housings 2 and 9. A rod 11 connects the upper cylindrical portion of the segment 6 which is formed as a loop, with a portion of the carrier 7 and extends through an arcuate slot 12 in the wall of the housing 2. A carrier 7 has two pins 14 which extend through two slots 15 provided in each end of each of the elongated screening elements 8. The slots 15 extend around the turning axis of the carrier 7 and the elongated screening elements and have different arcuate length.

When the device is to be transferred from the closed position to the open position in which it screens the vehicle window, the motor 4 is activated and through the transmission 5 it turns the segment 6 which in turn, turns the carrier 7 with the elongated elements 8. Since the slots 15 of the elongated elements 8 have different arcuate length, the pins 14 lift the elongated screening elements 8 at different heights so that the elongated screening elements 8 form a fan-like screen.

In order to prevent rearward bending or buckling of the elongated screening elements 8 away from the vehicle window, the device is provided with a supporting bracket 16 which is pivotably connected with the carrier 7 and is displaced by it from the closed position to the open position. In the open position, the supporting element 16 supports all elongated screening elements 8 from the rear side. A spring 17 connected by its one end with the box-shaped housing 9 and with its other end to the supporting element 16 pulls the supporting element 16 from the open position to the closed position together with the carrier 7. In order to allow the displacement of the supporting element 16, the supporting element 16 can be connected with the carrier 7 by a pin extending through the cylindrical hole in one element and an elongated hole in the other element, while the opposite end of the supporting element 16 can freely slide inside the box-shaped housing 9.

Figure 5:
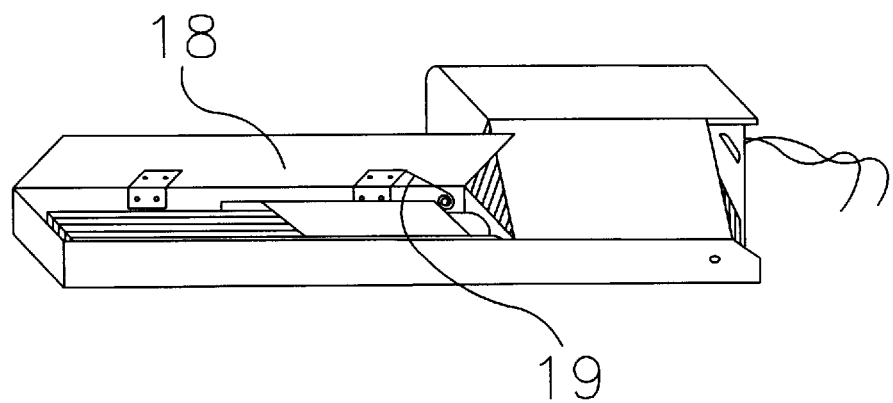
FIG. 5 is a view showing a box-shaped element for accommodating the elongated screening elements.

As shown in FIG. 5, the box-shaped element 9 has an openable and closeable cover 18. The cover 18 opens when the carrier 7 and the supporting element 16 are moved from the box-shaped housing 9. When the carrier 7 with the elongated screening elements 8 and the supporting element 16 are moved back to the closed position inside the box-shaped housing 9, a spring 19 pulls the cover 18 so that it doses the housing 9.

It will be understood that each of the elements described above, or two or more together, may also find a useful application in other types of constructions differing from the types described above.

While the invention has been illustrated and described as embodied in device for screening vehicle windows, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for screening vehicle windows, comprising drive means; a carrier turnable by said drive means about a turning axis; and a plurality of elongated screening elements which are turnable by said carrier between a closed position in which all said elongated screening elements are coextensive with one another and an open position in which said elongated screening elements are displaced relative one another to form a fan-like screen, said carrier having at least one pin which is spaced from said turning axis, said elongated screening elements having at least one substantially arcuate slot formed around said turning axis so that said pin can extend through all said slots of said elongated screening elements, said slots of said elongated screening elements having different arcuate length so that in said open position said screening elements are located at different angles from said closed position, said drive means including a motor, a transmission, and a segment connected to said motor through said transmission, said segment being connected with said carrier and being turnable by said transmission so as to turn said carrier about said turning axis.

2. A device as defined in claim 1, wherein said transmission includes a plurality of gear members engaging with one another, said plurality of gear members including an input gear member connected with said motor and an output gear member connected with said segment element.

3. A device as defined in claim 2, wherein said gear elements are formed so that a rotary speed of said output gear is smaller than a rotary speed of said input gear.

4. A device as defined in claim 1, wherein said carrier is formed as a bracket having one end turnable about said turning axis.

5. A device as defined in claim 4, and further comprising a supporting bracket which is arranged behind said elongated screening elements so as to support said elongated screening elements in said open position.

6. A device as defined in claim 1; and further comprising a substantially box-shaped element accommodating said carrier with said elongated screening elements, so that in said closed position, said carrier and said elongated screening elements are located inside said box-shaped element while in said open position said elongated screening elements are located outside of said box-shaped element.

7. A device for screening vehicle windows, comprising drive means; a carrier turnable by said drive means about a turning axis; and a plurality of elongated screening elements which are turnable by said carrier between a closed position in which all said elongated screening elements are coextensive with one another and an open position in which said elongated screening elements are displaced relative one another to form a fan-like screen, said carrier having at least one pin which is spaced from said turning axis, said elongated screening elements having at least one substantially arcuate slot formed around said turning axis so that said pin can extend through all said slots of said elongated screening elements, said slots of said elongated screening elements having different arcuate length so that in said open position said screening elements are located at different angles from said closed position; a supporting bracket arranged behind said elongated screening elements and supporting them in said open position, said supporting bracket being connected with said carrier and turnable together with said carrier between said closed and open position.

8. A device as defined in claim 7; and further comprising spring means for returning said supporting bracket from said open position to said closed position.

9. A device for screening vehicle windows; comprising drive means; a carrier turnable by said drive means about a turning axis; and a plurality of elongated screening elements which are turnable by said carrier between a closed position in which all said elongated screening elements are coextensive with one another and an open position in which said elongated screening elements are displaced relative one another to form a fan-like screening, said carrier having at least one pin which is spaced from said turning axis, said elongated screening elements having at least one substantially arcuate slot formed around said turning axis so that said pin can extend through all said slots of said elongated screening elements, said slots of said elongated screening elements have different arcuate length so that in said open position said screening elements are located at different angles from said closed position; a substantially box-shaped element accommodating said carrier with said elongated screening elements, so that in said closed position, said carrier and said elongated screening elements are located inside said box-shaped element while in said box-shaped element while in said open position said elongated screening elements are located outside said box-shaped element, said box-shaped element having an openable and closeable cover, said cover being openable by said carrier when said carrier moves from said closed position to said open position; and spring means for closing said covert.

* * * * *